United States Patent [19]

Krumm et al.

[11] 3,866,353
[45] Feb. 18, 1975

[54] PROCESS FOR PRODUCING METHANE-RICH GASES FROM HYDROCARBONS

[75] Inventors: Hagen Krumm, Frankfurt; Friedrich-Wilhelm Moeller, Seulberg, both of Germany

[73] Assignee: Metallgesellschaft Aktiengesellschaft, Frankfurt am Main, Germany

[22] Filed: Aug. 29, 1973

[21] Appl. No.: 392,722

[30] Foreign Application Priority Data
Mar. 24, 1973  Germany............................ 2314804

[52] U.S. Cl................ 48/214, 252/373, 260/676 R
[51] Int. Cl............................................... C01b 2/14
[58] Field of Search...... 48/214; 252/463, 465, 466, 252/373; 423/600; 260/676 R

[56] References Cited
UNITED STATES PATENTS

| | | | |
|---|---|---|---|
| 2,992,191 | 7/1961 | Erickson............................ | 252/465 |
| 3,415,634 | 12/1968 | Dent et al............................ | 48/215 |
| 3,420,642 | 1/1969 | Percival................................ | 48/214 |
| 3,433,610 | 3/1969 | Feldkirchner et al. .............. | 48/214 |
| 3,436,358 | 4/1969 | Thygesen............................. | 48/214 |
| 3,586,621 | 6/1971 | Pitchford et al..................... | 48/214 |
| 3,791,993 | 2/1974 | Rostrup-Nielson............. | 252/466 J |

FOREIGN PATENTS OR APPLICATIONS
1,032,753  6/1966  Great Britain

*Primary Examiner*—S. Leon Bashore
*Assistant Examiner*—Peter F. Kratz
*Attorney, Agent, or Firm*—Burgess, Dinklage & Sprung

[57] ABSTRACT

Methane-rich gases are produced from naphtha or kerosene-type feedstocks having an upper boiling point of 250°C. The hydrocarbons are reacted with water vapor at elevated temperatures and pressures of from 15 to 100 atmospheres in the presence of a nickel-based catalyst in two reaction zones. In the first zone, 40–50 percent of preheated vaporized hydrocarbon is mixed and reacted with 80–90 percent of the water vapor required for the overall reaction. The product gas from the first reaction zone is cooled and mixed with the remaining vaporized hydrocarbons and the remaining water vapor and is then fed to the second reaction zone. The reaction conditions in both zones are such that the temperature of the catalyst in both zones is in the range 300°–500°C. The reaction is preferably carried out in the presence of a catalyst which is 50 to 60 weight percent nickel on a magnesium spinel support.

5 Claims, 1 Drawing Figure

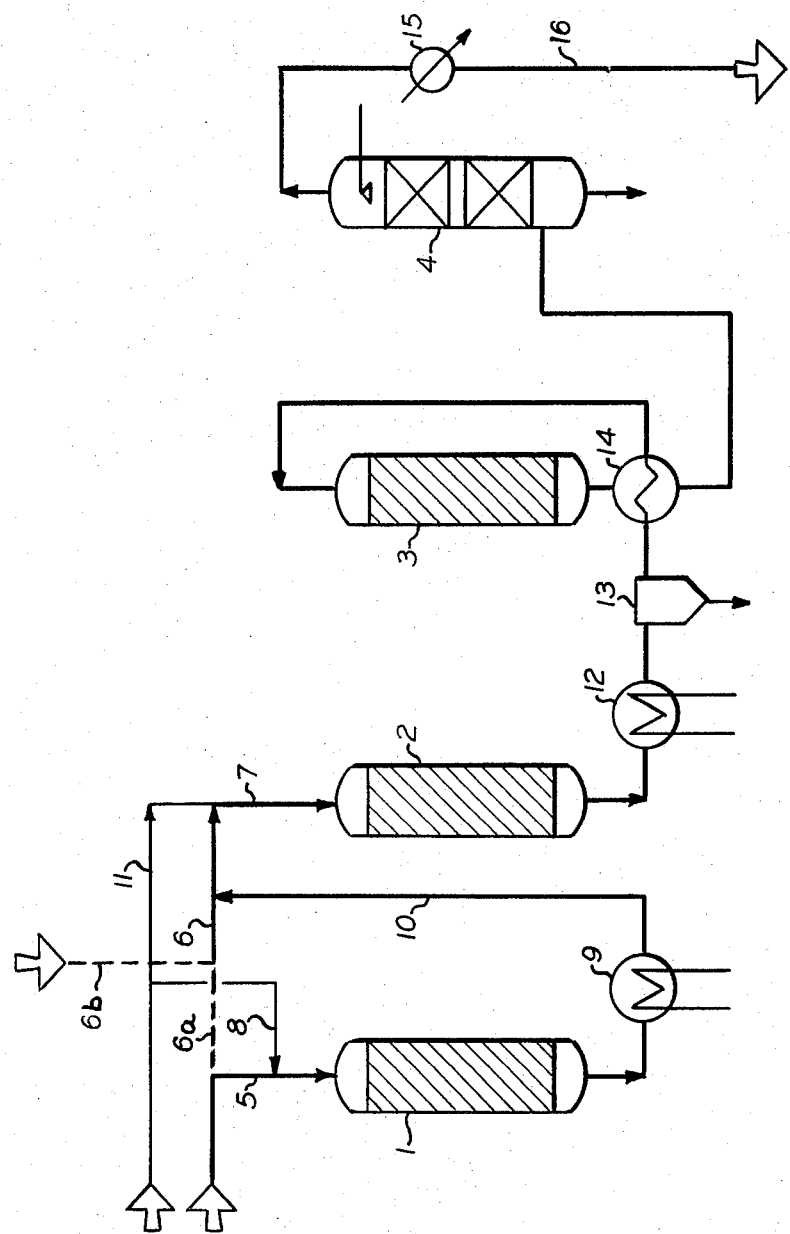

PROCESS FOR PRODUCING METHANE-RICH GASES FROM HYDROCARBONS

BACKGROUND

This invention relates to a process for the production of methane-rich gases by reacting vaporized hydrocarbons of the naphtha or kerosene-type having an upper boiling point of about 250°C. with water vapor at elevated temperatures and under a pressure of from 15 to 100 atmospheres with nickel catalysts in two reaction zones.

Because of changing industrial and municipal usage of natural gas and because of the ever-increasing need for gas, it has become important to produce methane from liquid hydrocarbons.

There are known processes, sometimes referred to as rich gas processes, which decompose or crack liquid hydrocarbons in the naphtha range with water vapor in the presence of nickel catalysts to give a rich gas with a high methane content. It is one aim in these processes to prevent formation of carbon black resulting from the Boudouard reaction, because if carbon black is formed, it covers the catalyst and slowly stops the decomposition reaction.

A known measure to prevent carbon black formation is using a high excess of water vapor, which, however, is not advantageous for methanation. In British Pat. No. 820,257, a process for the production of methane-rich gas is described which is especially suited for paraffinic hydrocarbons with an average of 4 to 10 carbon atoms per molecule. These hydrocarbons are mixed with 2 to 5 parts by weight of water vapor per one part by weight of hydrocarbons, preheated to a temperature above 350°C. and reacted on a catalyst comprising metallic nickel on a support of alumina at temperatures in the range of 400°–550°C. It is also known from this patent to reduce the weight ratio of water vapor to hydrocarbons to 1.5 by using lighter hydrocarbons with an average of 4 to 7 carbon atoms per molecule. For hydrocarbon mixtures in the naphtha and kerosene ranges, available in large quantities as refining products, however, higher weight ratios of water vapor to hydrocarbons are necessary because of the greater number of carbon atoms per molecule.

A rich gas thus produced contains (dry) about two-thirds of methane, the rest being substantially $CO_2$ and $H_2$ and a small amount of CO. From such a rich gas, a gas mostly consisting of methane can be produced in known manner and used as a substitute natural gas. This is done by hydrogenation of the $CO_2$ and CO in the rich gas thus forming methane. This exothermic reaction is commonly known as "methanation."

In a process described in U. S. Pat. No. 3,420,642, liquid hydrocarbons are reacted with water vapor in the presence of a nickel catalyst at temperatures of 400°–600°C. in a multi-stage process wherein all the water vapor necessary for the overall reaction is fed to the first stage and is carried through subsequent stages, while the hydrocarbons are fed in about equal amounts to the different stages. Thus, the first stage of this process receives a high weight ratio of water vapor to hydrocarbons and in the subsequent stages the water vapor content diminishes while the amounts of methane, hydrogen and carbon dioxide increase. When carried out in two stages or more, the overall weight ratio of water vapor to hydrocarbons is 1.6 or higher, preferably at least 2.0.

SUMMARY

It is an object of the invention to react hydrocarbons, even in the kerosene-range, having an upper boiling point of about 250°C., to produce a rich gas in an inexpensive manner. This means mainly a low weight ratio of water vapor to hydrocarbons to be reacted and also long catalyst life. Furthermore, reacting with a low water vapor content results in a low hydrogen content in the rich gas produced which is advantageous for methanation to produce a gas which can substitute for natural gas. A low hydrogen content is desirable in methanation because it diminishes heat generated by the hydrogenating carbon oxides. A further advantage is a more favorable reaction equilibrium in the gas to be methanated, that is, more carbon dioxide can be reacted to methane because of the lower water vapor content.

The process of the invention comprises feeding to a first reacting zone a mixture of vaporized hydrocarbons and water vapor, the amount of hydrocarbons being 40–50 weight percent of the total hydrocarbon feedstock together with 80–90 weight percent of the total water vapor feedstock, cooling the product gas from the first reaction zone, mixing same with the remaining 60–50 weight percent of the vaporized hydrocarbon feedstock and the remaining 20–10 weight percent of the water vapor feedstock, feeding the resulting mixture to a second reaction zone, thereby maintaining temperature of the catalyst in both reactors in the range of 300°–500°C.

DESCRIPTION OF THE DRAWING

The accompanying drawing is a schematic flow diagram of a preferred embodiment for carrying out the process of the invention.

DESCRIPTION

The process also makes it possible to feed different hydrocarbons to the two reaction zones or stages of the invention, for example by feeding a low boiling hydrocarbon fraction into the first zone and a higher boiling fraction, which is usually less expensive, to the second zone.

The water vapor fed to the second stage is also advantageous for dispersing the newly added portion of the hydrocarbon feedstock over the catalyst in the second zone. This is especially useful in the case of kerosene.

The process of the invention makes it possible to employ an overall water vapor to hydrocarbon weight ratio below 1.4 to 1 and preferably in the range of 1.3:1 to 1:1.

Adding water between the outlet of the first stage and the inlet of the second stage makes it possible to employ the generally low overall ratio described above and provides an economic advantage in that large excesses of steam are not carried through the first stage of the process.

A preferred embodiment of the invention is illustrated in the drawing. About one-half of the total feedstock of preheated and desulfurized hydrocarbon at a temperature between 350° and 390°C is fed through line 5 to the first rich gas reactor 1. Before entering reactor 1, the portion of hydrocarbon feedstock is mixed with about twice its weight of superheated steam from line 8. The normal water vapor to hydrocarbon weight ratio of the mixture fed to reactor 1 is about 2:1. The mixture enters reactor 1 at a temperature of 300°–420°C, preferably 340°–410°C.

In reactor 1, the overall reaction in the presence of a nickel catalyst is exothermic and the product gas leaving reactor 1 has a temperature of from 430°–550°C., preferably 440°–500°C. This product gas is cooled in heat exchanger 9 such that the temperature of the mixture entering reactor 2 is within the same range as for reactor 1.

Product gas in line 10 from heat exchanger 9 is fed to conduit 6 where it is mixed with hydrocarbon feedstock for reactor 2. This feedstock may be part of the hydrocarbon feedstock fed to reactor 1 which is branched off from line 5 and passes through lines 6a, 6 and 7 to reactor 2. If the hydrocarbon material for reactor 2 differs from the one used for reactor 1, and is for example, kerosene, it passes through lines 6b, 6 and 7.

The mixture of product gas from reactor 1 and hydrocarbon feedstock for reactor 2 is supplied with water vapor from line 11. This portion of water vapor fed in line 7 is about one-ninth to one-fourth of the water vapor fed in line 8 to line 5. The mixture of product gas, preheated hydrocarbons and water vapor enters the second rich gas reactor 2 through line 7.

The product gas coming from reactor 2 mostly contains methane. This product gas is cooled in heat exchanger 12 to temperatures of about 60°–120°C to condense most of the water vapor still in the product gas. The condensed water is removed in knock-out drum 13. The dried product gas is then heated in heat exchanger 14 to the inlet temperature, about 300°C., for the methanation reactor 3. In the methanation reactor 3, $CO_2$ and CO still contained in the gas are partly hydrogenated in the presence of a nickel catalyst thus consuming hydrogen. After methanation the gas consists of more than 90 percent of methane with the balance mostly carbon dioxide. In a carbon dioxide scrubber 4 this residue $CO_2$ is also removed. After cooling in heat exchanger 15, the gas suitable as a substitute for natural gas is in line 16.

The catalyst used in reactors 1 and 2 as well as in methanation reactor 3 advantageously contains more than 50 up to 60 percent by weight of nickel. One preferred catalyst is nickel on a magnesium spinel ($MgAl_2O_4$) support. This preferred catalyst is prepared by first producing the precursor $Ni_5MgAl_2(OH)_{16} \cdot CO_3 \cdot 4H_2O$ from an aqueous solution. This precursor is then dried at a temperature of 90°–120°C, calcined at a temperature in the range of 390°–410°C and reduced in a stream of hydrogen. It is preferred to raise the temperature between drying stage and calcination stage with a gradient in the range of 1.66° to 3.33°C. per minute. The catalyst contains about 54 percent by weight of nickel. The precursor $Ni_5MgAl_2(OH)_{16} \cdot CO_3 \cdot 4H_2O$ can be prepared in several manners. One way is to prepare the following two 2-molar solutions: For the first solution, 3.345 kg $Ni(NO_3)_3 \cdot 6 H_2O$ together with 0.588 kg $Mg(NO_3)_2 \cdot 6 H_2O$ and 1.722 kg $Al(NO_3)_3 \cdot 9H_2O$ are dissolved in sufficient water to give a solution of 9 liters. The second solution is prepared by dissolving 3.06 kg $K_2CO_3$ in 11 liters of water. Into a stirring vessel containing 2 liters of water at a temperature of 60°C. and having means for continuously measuring pH value, an amount of the second solution is added such that the mixture has a pH of 9.5. Then, keeping the temperature and pH constant, the first and the balance of the second solution are added to the vessel while stirring. This results in a precipitation and stirring is continued for 45 minutes at 60°C. temperature. After filtering and washing the precipitate free of alkali, it is suspended in 14 liters of water and further stirred for 4 hours at 60°C. to give the precursor which is dried, calcined and reduced as described above to give the preferred catalyst.

The gasoline used in the following examples is a full range naphtha with a lower boiling point of 42°C. and an upper boiling point of 183°C. This naphtha which initially has a sulfur content of 80 miligram per kilogram of naphtha, is first fed into a known desulfurization process to decrease its sulfur content below 1 miligram per kilogram of naphtha. Before desulfurization hydrogen is added to the naphtha in an amount of 0.05 standard cubic meter per kilogram of naphtha for the hydrogenation of unreactive sulfur compounds.

In the second example predesulfurized kerosene from a light Iranian export crude oil is used. It has a boiling range from 175°–250°C. and a sulfur content of 20 miligram per kilogram of kerosene. Before reaction this kerosene will be further desulfurized in the same manner as the naphtha. 0.05 standard cubic meters of hydrogen are added to 1 kilogram of kerosene for desulfurization.

EXAMPLE 1

In a laboratory scale process, a mixture of 2 kilograms of full range naphtha with 0.1 standard cubic meters of hydrogen per hour under a pressure of 48 atmospheres and preheated to 390°C are fed to a desulfurization step. Half of the desulfurized naphtha is then mixed with 2 kilograms per hour of water vapor and fed into the first reactor 1 filled with catalyst. This reactor 1 as well as the second reactor 2 contain half a liter of a highly active catalyst with a large specific surface area. The catalyst is nickel on a support of magnesium spinel produced in the manner described above. The temperature of the water vapor being admixed is adjusted in such a manner to give the mixture entering reactor 1 the temperature of 380°C.

1.76 standard cubic meters per hour of product gas exits from reactor 1 at a temperature of 480°C. and pressure of 47 atmospheres. The composition of this gas, calculated on a dry basis, is as follows:

$CO_2$ = 22.6 percent by volume
$CO$ = 0.4 percent by volume
$H_2$ = 10.1 percent by volume
$CH_4$ = 66.9 percent by volume.

Each standard cubic meter of dry product gas also contains 0.77 standard cubic meter of water vapor.

The product gas is cooled down and then mixed with the remaining half of desulfurized naphtha to which 0.4 kilograms per hour of water vapor is added. The whole mixture is then fed into reactor 2. The overall weight ratio of water vapor to hydrocarbons fed to reactors 1 and 2 is 1.2 to 1. The product gas from reactor 1 is cooled down to such a temperature that the inlet temperature of the mixture being fed into reactor 2 is 380°C.

The product gas leaves reactor 2 at a rate of 3.37 standard cubic meters per hour at a temperature of 480°C and pressure of 45 atmospheres. The gas, calculated on a dry basis, contains the following:

$CO_2$ = 22.4 percent by volume

CO = 0.6 percent by volume
H$_2$ = 6.0 percent by volume
CH$_4$ = 71.0 percent by volume.

Each standard cubic meter of the dry gas contains 0.43 standard cubic meters of water vapor.

The gas production ran for 600 hours without any change in the product composition during the run. After the run, the catalyst material was still as active as initially and was free of carbon black.

EXAMPLE 2

In another laboratory scale process the first reaction state (involving reactor 1) is handled in substantially the same manner as described in Example 1. The only difference is that the temperature of the water vapor mixed with the naphtha is adjusted so that the temperature of the mixture fed to reactor 1 is maintained at 355°C. This mixture is composed of 1 kilogram of naphtha, 0.05 standard cubic meter of hydrogen and 2 kilogram of water vapor per hour. Both reactors 1 and 2 contain one-half liter of the catalyst used in Example 1.

The product gas leaving reactor 1 at a rate of 1.73 standard cubic meters per hour at a pressure of 47 atmospheres and a temperature of 460°C. contains, calculated on a dry basis, the following:

CO$_2$ = 22.7 percent by volume
CO = 0.3 percent by volume
H$_2$ = 8.5 percent by volume
CH$_4$ = 68.5 percent by volume.

Each standard cubic meter of dry gas contains 0.79 standard cubic meters of water vapor.

The product gas is cooled down and mixed with 1 kilogram per hour of the desulfurized kerosene described above (which contains 0.05 standard cubic meters of hydrogen per kilogram of kerosene) and with 0.4 kilograms per hour of water vapor. The mixture produced is fed to reactor 2 at a temperature of 350°C. which is adjusted by cooling down the product gas from reactor 1 accordingly. The overall weight ratio of water vapor to hydrocarbons fed into reactors 1 and 2 is 1.2:1.

The product gas leaving reactor 2 at a rate of 3.42 standard cubic meters per hour at a pressure of 45 atmospheres and a temperature of 500°C. contains, calculated on a dry basis, the following:

CO$_2$ = 23.4 percent by volume
CO = 0.8 percent by volume
H$_2$ = 6.8 percent by volume
CH$_4$ = 69.0 percent by volume.

Each standard cubic meter of dry gas still contained 0.39 standard cubic meters of water vapor.

The gas production ran for 600 hours without any change in the product or in the catalyst. After the run the catalyst retained its initial level of activity and did not contain any carbon black.

What is claimed is:

1. Process for producing methane-rich gases by reacting vaporized hydrocarbons of the naphtha or kerosene-type being substantially free of sulphur compounds and having an upper boiling point of about 250°C with water vapor in the presence of a catalyst at elevated temperatures and under a pressure of from 15 to 100 atmospheres in two reaction zones, which comprises:

i. feeding a mixture of 40–50 percent by weight of preheated vaporized hydrocarbons with 80–90 percent by weight of the water vapor into a first reaction zone;

ii. cooling the product gas coming from the first reaction zone;

iii. thereafter mixing same with the remaining 60–50 percent by weight of preheated vaporized hydrocarbons and with the remaining 20–10 percent by weight of the water vapor and feeding the resulting mixture to a second reaction zone, thereby maintaining the temperature of the catalyst in both reaction zones in the range of 300°–500°C;

iv. the overall water vapor to hydrocarbons weight ratio being less than 1.4; and v. the catalyst in both reaction zones containing more than 50 up to 60 weight percent nickel on a spinel (MgAl$_2$O$_4$) support.

2. Process of claim 1 wherein said overall water vapor to hydrocarbons weight ratio is between 1.3 and 1.0.

3. Process of claim 1 wherein the catalyst in both reaction zones is maintained at a temperature between 350° and 500°C.

4. Process of claim 1 wherein the pressure in both reaction zones is about 25–60 atmospheres.

5. Process of claim 1 wherein the hydrocarbon fed to the first reaction zone is of the naphtha-type and the hydrocarbon fed to the second reaction zone together with said product gas from the first reaction zone and water vapor is of the kerosene-type.

* * * * *